Feb. 6, 1934.  H. ROSENTHAL  1,946,294
MEANS OF POWER TRANSMISSION
Filed June 2, 1931  3 Sheets-Sheet 3

INVENTOR
Henry Rosenthal

Patented Feb. 6, 1934

1,946,294

UNITED STATES PATENT OFFICE 1,946,294

MEANS OF POWER TRANSMISSION

Henry Rosenthal, New York, N. Y.

Application June 2, 1931. Serial No. 541,629

16 Claims. (Cl. 290—17)

My invention relates to means and methods of power transmission and more particularly to an improvement in means and method of transmitting power from the prime mover to the driving wheels in automotive equipment. However, I do not limit my invention to this use and neither do I limit it to any particular type of engine, as any prime mover may be used.

It is well known that higher efficiency is usually attained when operating an engine at or near full load than when such engine is lightly loaded. One of the objects of my invention is to provide means whereby the engine will be operated at or near full load for the greater part of the time that it is in use, and at the same time to provide means for limiting the speed of the prime mover.

What I mean herein by "full load" is the maximum steady output of the engine at any given speed. It may be the case that "full load" as described above, is a higher load than that at which the engine will deliver energy with the greatest economy. If this were the case, it may be desirable to interpose in the system a throttle which would limit the maximum steady output of the engine at any given speed to that at which the engine operates at approximately maximum economy. Under this condition the "economic load" would become the "full load" as described above, and as used in this invention. My system may be operated all of the time at "full load" of the engine or at "economic load" or part of the time at "full load" and part of the time at the "economic load," or vice versa.

By means of my invention, the prime mover can be operated at or near full load and will automatically adjust itself to variations in applied load. My invention consists in means and method of automatically regulating the speed of the prime mover by means of the torque and horsepower of the applied load so as to maintain substantially full load on the prime mover, and also includes means of limiting the speed of the prime mover. My invention depends for its operation on the controlling of the speed of the prime mover by controlling the countertorque which opposes the revolution of the prime mover.

Certain broader features of the arrangement herein disclosed are claimed in my co-pending application Serial 503,458, filed December 19, 1930, these features being the combination of a prime mover, an intermediate member, and a driving member in which the torque of the intermediate member is adjusted by separate metering means so that the prime mover speed increases on increase of load. Also included are means of controlling the speed of the driving member. These features are included but not claimed in this present application.

The present invention is applicable to an electrical transmission adapted for the use of series motors as propelling means but is not limited to this adaptation, as it is equally suitable to other adaptations. I preferably utilize such electrical transmission accomplishing the control through a relay, one element of which comprises two co-acting coils one of which coils carries current proportional to the armature current of the generator whose torque opposes the rotational movement of the prime mover while the other coil carries current proportional to the current in the main field of this generator. Thus the action of these two coils on each other is substantially proportional to the torque of the generator, and by utilizing this relay to control the main field of the generator, the torque of the generator can be maintained at any predetermined value. In effect, the relay acts to substantially measure the generator torque, and at the same time to control and adjust the torque to any predetermined value. If the co-action of the two relay coils is balanced by a substantially constant force, the torque of the generator will remain substantially constant except for means provided to prevent such constancy. I provide such means either by an opposing series field on the generator or by proper additional coil or coils on the relay whereby the torque of the generator may be reduced as its armature current is increased due to an increase in load on the driving motors. This permits of an increase in speed of the prime mover as the load on the driving motor increases.

By providing means of decreasing the strength of that coil of the relay which carries current proportional to the current of the main field of the generator, the relationship of the two co-acting coils will be altered and the combination of elements will act to place additional torque on the prime mover and thus retard its rotation. This provides means of limiting the maximum speed of rotation of the prime mover which means may be operated by the speed of the prime mover itself. Thus, when the prime mover reaches a pre-determined maximum speed, it acts through any form of control device to decrease the strength of the coil carrying current proportional to the current of the main field, and the speed of the prime mover will be automatically limited to that predetermined maximum value.

By providing means of increasing the strength of that coil of the relay which carries current proportional to the current of the main field of the generator, the relationship of the two co-acting coils will be altered and the combination of elements will act to reduce the torque restraining the prime mover and thus increase its speed of rotation. This method provides a means of limiting the minimum speed of rotation of the prime mover which means may be operated by the speed of the prime mover itself. Thus, when the prime mover reaches a pre-determined minimum speed, it acts through any form of control device to increase the strength of the coil carrying current proportional to the current of the main field, and the speed of the prime mover will be automatically limited to that pre-determined minimum value.

By arranging the system in such a manner that the coil carrying current proportional to the current in the main field is weakened when the prime mover reaches a predetermined maximum speed, and strengthened when the prime mover reaches a predetermined minimum speed, the prime mover can be kept in operation within a pre-determined speed range. This range can be varied at the will of the designer or operator. In certain classes of service, more especially on certain railway services, operating on steel rails over private right-of-way, it is sometimes desirable to operate at or near the maximum power output of the prime mover. This can be accomplished with my invention by adjusting the pre-determined maximum and minimum speeds within a narrow range and preferably close to that speed of the prime mover at which the maximum safe power can be delivered.

My invention is shown in the accompanying drawings in several modifications, but I do not limit my invention to the forms shown. My invention will better be understood by reference to the following description taken together with the attached drawings forming a part of this specification, and in which Figure 1 shows schematically the essentials of one embodiment of my invention.

Figure 1:
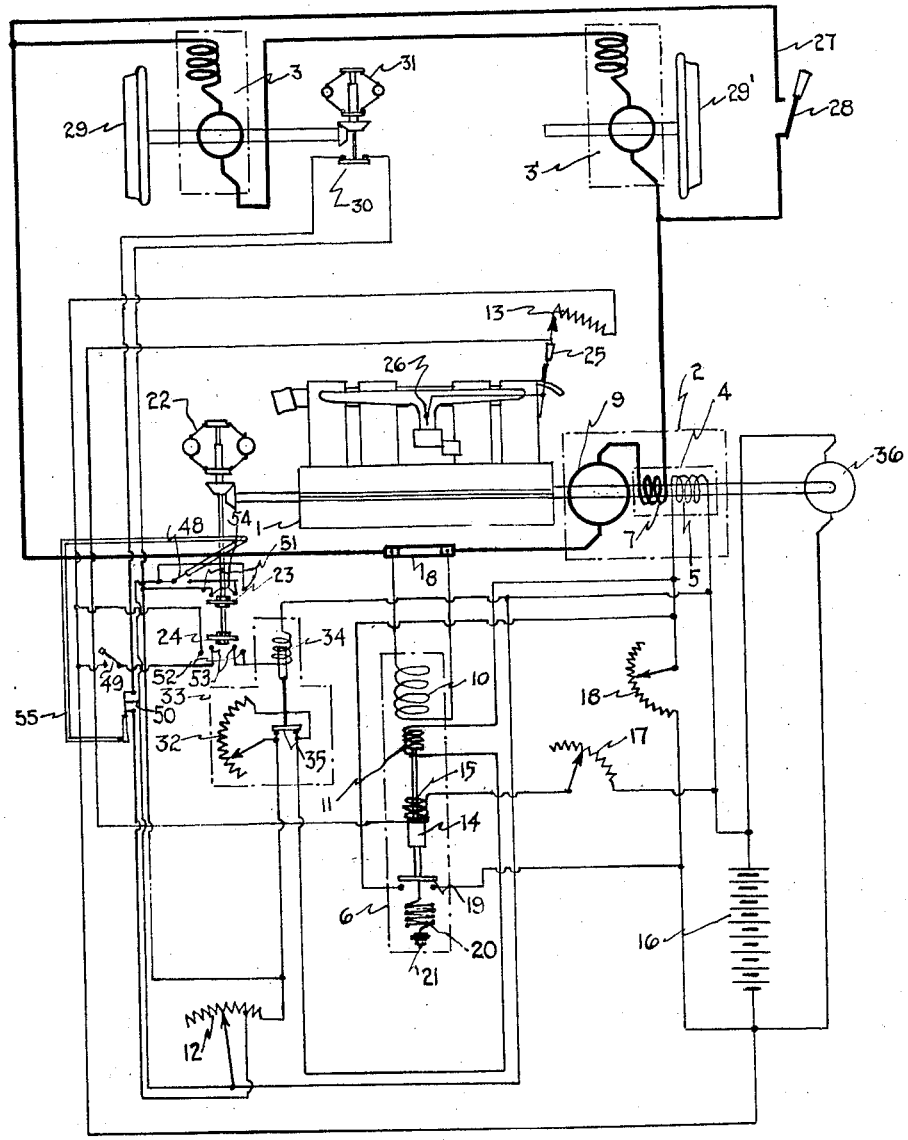
Figure 2:
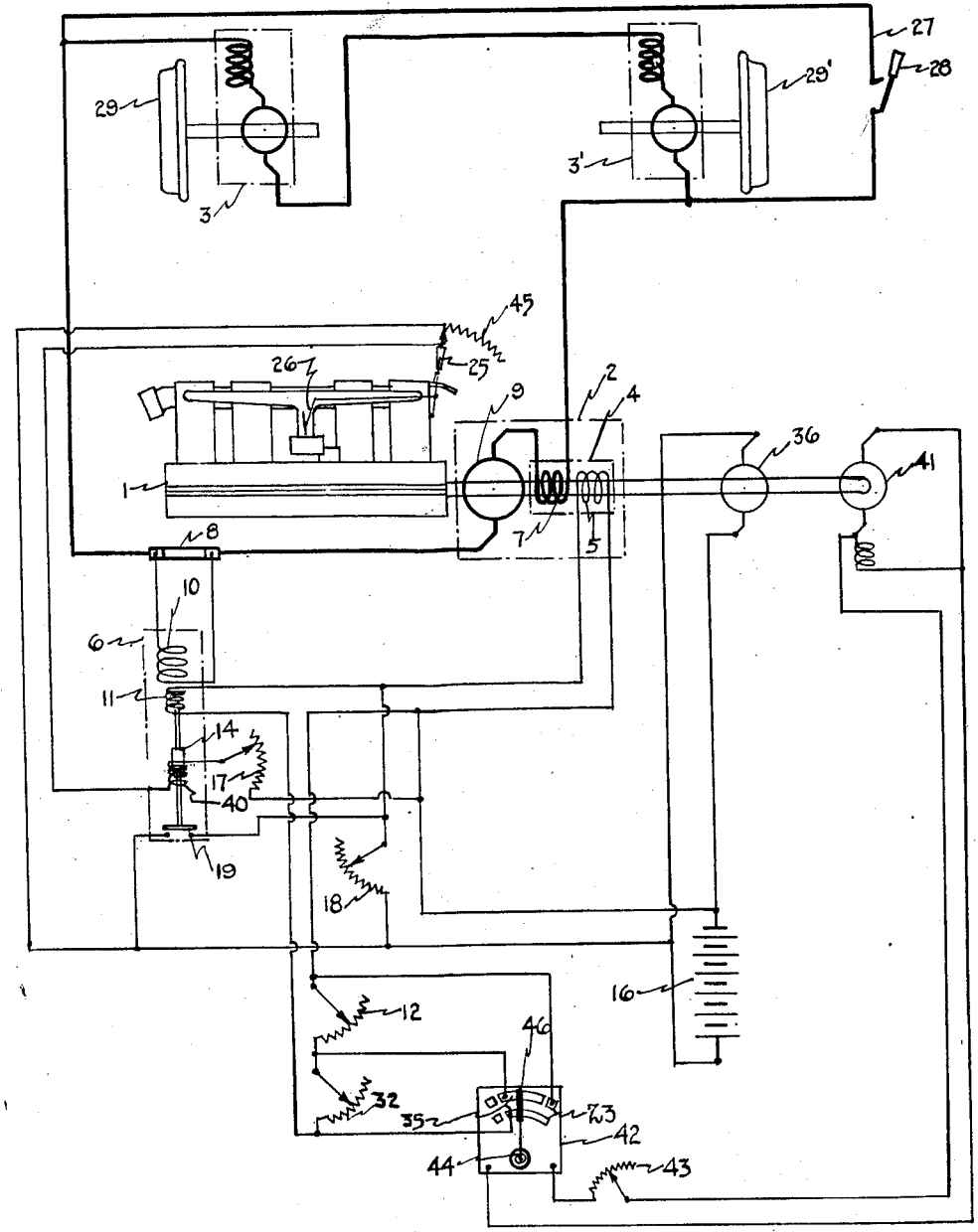
Figure 2 shows schematically a modified form of my invention.

In Figures 1 and 2, similar numbers refer to like parts.

Referring to Figure 1, the prime mover 1, is connected by suitable means to the electric generator 2, whereby the torque and horsepower developed by the prime mover are transmitted to the generator. Electric motors 3 and 3' are connected electrically to the generator and by suitable means to the apparatus to be driven, as shown in this case the wheels 29 and 29' of a vehicle (not shown).

The main generator 2 is for direct current, with a differential compound field 4. A portion 5 of the field 4 is adapted for separate excitation. The other portion 7 of this field is excited by means of the current flowing through the generator armature 9, and is wound and connected so as to oppose the field of the portion 5. The current in the separately excited field portion 5 is controlled by the relay 6.

In the relay 6, coil 10 carries a current proportional to the current in the generator armature 9. This current may be obtained either by utilizing the drop of potential across a shunt 8 connected in series with the generator armature 9 as shown, or it may in some cases be desirable to dispense with the shunt, in which case the coil 10 would carry directly the current of the generator armature 9 by being placed in series with the generator armature.

Coil 10 co-acts with coil 11 to produce a force to operate the relay 6. Coil 11 is relatively movable with respect to coil 10 and coil 10 as illustrated is fixed relative to the relay base. Coil 11 carries a current proportional to the current in the separately excited portion 5 of the field 4 of the generator 2. I prefer to obtain this proportionality of current by connecting the coil 11 directly across the field portion 5, but preferably through the adjustable resistance 12. Other means may be used for obtaining proportionality of current in coil 11 and field portion 5, such for instance as connecting coil 11 in series with field portion 5 with adjustable shunting resistance across one or the other.

The action of coil 10 on coil 11 will tend to open contacts 19 in opposition to the tension of spring 20 tending to close them. Coil 15 is fixed to the relay base and also operates when energized to attract armature 14 in opposition to the tension of spring 20. The force of spring 20 may be adjusted by any suitable means as for instance the nut 21. This coil may be energized by connecting it across the battery 16 with the energizing current controlled by the adjustable resistances 13 and 17. Resistance 13 is operated by movement of the throttle lever 25 and in the position of wide open throttle this circuit has maximum resistance in place and may be opened so that no energizing current flows through coil 15. However, I prefer that the circuit should remain closed through resistance 13, even with wide open throttle position in order that adjusting resistance 17 remain effective to the operation. In this way, a constant but adjustable force is obtained to oppose the force of the coil 10 co-acting with coil 11. By reducing the resistance in series with the coil 15 as the throttle of the prime mover 1 is closed, the force opposing the force of the coil 10 co-acting with coil 11 is decreased and by proper adjustment of resistance 13, the relay 6 will function properly to control the prime mover at any throttle position with its corresponding torque range. Resistance 17 is placed in circuit to aid in obtaining proper balance, independently of the position of the throttle.

Current for field portion 5 is obtained from battery 16 through adjustable resistance 18 which is adapted to be short-circuited by the contacts 19 of the relay 6. In this manner, when the torque of the generator falls below a pre-determined value as measured by the relay 6, the field strength of the generator is increased with a consequent increase in generator torque and a decrease in the speed of the prime mover. The reverse action takes place when the torque of the generator exceeds the pre-determined value as measured by the relay 6.

Battery 16 may be charged by the substantially constant potential generator 36 with which it may be connected by proper controlling devices. Generator 36 is preferably driven by a separate prime mover, but it may be one of the well known types of generators designed to supply substantially constant potential, even when driven from a variable speed shaft, and with proper precaution it may be driven by the prime mover 1.

The governor 31 is suitably connected to the wheels of the vehicle and operates at a speed proportional to the speed of the vehicle. This governor is suitably adjustable so that at any predetermined speed it will operate to disconnect the contacts 30 which in turn operate to remove the short circuit from around resistance 12 or a portion thereof. In this manner metering ratio of relay 6 is altered and relay acts to control the generator at a higher torque value. This acts to slow down the prime mover. It will develop less power and the vehicle will slow down. Switch 50 in series with the contacts 30 allows the governor 31 to be disconnected whenever this is desirable.

The governor 22 is suitably connected to the prime mover 1, and operates at a speed proportional to the speed of the prime mover. This governor is provided with the contacts 23 and 24. Contact 23 is adjustable so as to make contact at any predetermined speed desired as a minimum operating speed for the prime mover, and contact 24 is adjustable so as to make contact at any predetermined speed desired as a maximum operating speed desired for the prime mover. The closing of contact 23 on the prime mover reaching the predetermined minimum speed operates to short circuit resistance 12 or a portion thereof, in series with the relay coil 11. In this manner the metering ratio of relay 6 will be so changed as to control the generator 2 at a lower torque value. The closing of contact 24 on the prime mover reaching the predetermined maximum speed operates to increase the resistance in series with coil 11 by inserting in the circuit the adjustable resistance 32. As shown this is accomplished by the energizing of coil 34 of relay 33 by means of the battery 16 on the closing of the contact 24. The operation of relay 33 opens the contacts 35 and removes the short circuit from across the resistance 32. In this manner the metering ratio of relay 6 will be so changed as to control the generator 2 at a higher torque value. Switch 48 in series with contacts 24 provides means of connecting and disconnecting the governor 22 in controlling the minimum speed of the engine. This may be done at the will of the operator. A similar switch 49 may be provided for connecting and disconnecting the control of maximum speed of the prime mover.

Two motors are shown in the illustration but I do not limit my invention to this number as any convenient number of motors may be used. When more than one motor is used, series or parallel connections may be used and where four or more motors are used, series-parallel connections may be used as well by providing suitable control equipment. I have not shown in the diagram, connections and switching for connecting or disconnecting the motors from the circuit, as such means are well known in the art. However I have shown connection 27 which on the operation of a suitable switch 28 short circuits the motors 3 and 3' thus allowing relay 6 to control the action of the prime mover even though the vehicle is stationary.

The lever 25 is adapted to operate throttle 26 of the prime mover 1, as well as to adjust the resistance of the adjustable resistance 13. When the throttle is closed, the resistance 13 is substantially out of circuit and when the throttle is wide open the maximum amount of resistance 13 is in circuit or the circuit containing resistance 13 is broken.

In general the prime mover 1 supplies power to drive the generator 2 which in turn supplies electricity to the electric motors 3 and 3' which drive the vehicle. I prefer to operate with the throttle 25 in the wide open position with the speed of the prime mover governed by the countertorque of the generator 2.

The relay 6 acts to adjust the field portion 5 of the generator 2 so that, neglecting the action of the series portion 7 of the field 4, the torque of the generator remains at substantially a constant value. This value can be adjusted by proper setting of the adjustable spring 20, so that the torque of the generator, considering all the inherent factors, balances the torque of the prime mover at any desired speed and load. With the vehicle operating under conditions to produce this load, the prime mover will assume this speed. Should the load on the motors be increased for any reason, such as encountering a more severe grade, a greater current will be required by the motors which in turn will cause relay 6 to act in such a manner as to decrease the field strength of the field portion 5. If no differential field were provided on the generator, its torque would remain constant; but with the differential field portion 7, carrying current proportional to the motor current, any increase in the motor current causes a reduction in generator torque which in turn allows the speed of the prime mover to increase and the prime mover will thus deliver the greater amount of power required by the load. With a decrease in the power required by the vehicle, the reverse action takes place.

If constant potential were supplied to a series motor, an increase in load would cause a decrease in motor speed and consequently in vehicle speed. As the speed of the prime mover will increase and the field strength of the generator will decrease with an increase of load on the motors, the delivered voltage will be dependent on the relative changes in these two factors. The speed change of the vehicle will also be dependent upon these two factors as well as on the inherent characteristics of the motors. The relative change in field strength and engine speed depends upon the characteristics of the prime mover and the relation between the series field 7 and armature 9 to the field 4 of generator 2, which latter in turn depends upon the relation of the strength of coils 10 and 11 of relay 6. By adjusting resistance 12, the relation of the strength of these coils may be adjusted, and by proper setting of this resistance the vehicle can be made either to maintain substantially constant speed, or to approach the same variations in speed as would occur under the same variations in load with a constant potential supply, or intermediate values of speed changes may be made to occur.

It can be seen from the above that the speed of the vehicle is under substantial control without changing the position of the throttle 26 simply by adjusting resistance 12. This adjustment in vehicle speed may be used substantially whenever adjustment of the vehicle is desired.

Such a change in vehicle speed will result in a change in the amount of power required and a change in the speed of the prime mover. An increase in the relative value of the shunt windings as compared to the series windings of the generator will result in lower vehicle speed, lower vehicle horsepower, and lower rotational speed of the prime mover. The opposite effect will take place with a decrease in the relative value of the shunt windings as compared to the series windings. This effect, I utilize to place limits on the rotational speed of the prime mover. Thus when the prime mover reaches a predetermined maximum value of rotational speed, by operating at that speed to decrease the strength of coil 11, it in turn increases the strength of field portion 5 which reduces the speed of the vehicle, the amount of power required, and the speed of the prime mover, which is thereby limited to the predetermined value. When the prime mover reaches a predetermined minimum value of rotational speed, it operates to increase the strength of coil 11, which in turn operates to reduce the relative value of field 5. The speed of the vehicle is thereby increased, the amount of power required by the vehicle is increased, and the speed of the prime mover is increased, and is thereby limited to the predetermined value. The predetermined maximum value and the predetermined minimum value of rotational speed of the prime mover may be as close to each other as may be desired or the control of either one of these limiting values may be omitted if desired.

The governor 31 is provided to limit the speed of vehicle to any pre-determined maximum value. When this predetermined value is reached, contacts 30 open and change the value in series with relay coil 11, this acting to change the metering ratio of the relay 6, thus changing the relationship of the current in armature 9 and field 7 relative to the current in field 5 of the main generator 2. This acts in such a way as to reduce both the speed of the prime mover as well as the speed of the driving motors. This vehicle speed limiting device may be omitted if desired, and I prefer to omit it when control is included to limit the minimum operating speed of the prime mover as shown in Figure 2; further, when this vehicle speed limiting device is included, I prefer to omit control to limit the minimum operating speed of the prime mover, unless the condition of operation be such that these two controls will not interfere with each other as may be the case unless special care be used in the design or operation of the system.

The torque of any load on the prime mover other than that exerted by generator 2 will not be measured and controlled by relay 6. I therefore prefer that where possible battery 16 be charged from a source driven by a separate prime mover. However, this is not practical in some cases and by proper care and adjustments, the battery 16 may be charged from a substantially constant potential generator driven by the prime mover 1. This can be done if the load imposed on the prime mover by the constant potential generator is relatively small, if the torque of the constant potential generator is relatively constant and is compensated by proper adjustment of the balancing spring of relay 6, or if the torque characteristics of the constant potential generator are such that it will co-operate in effecting the proper speed regulation of the prime mover 1. This latter may be effected if the torque of the charging generator decreases as the prime mover speed increases, thus cooperating with the effect of the series field 7, to decrease the torque opposed to the rotation of the prime mover as the load on generator 2 increases.

Figure 3:
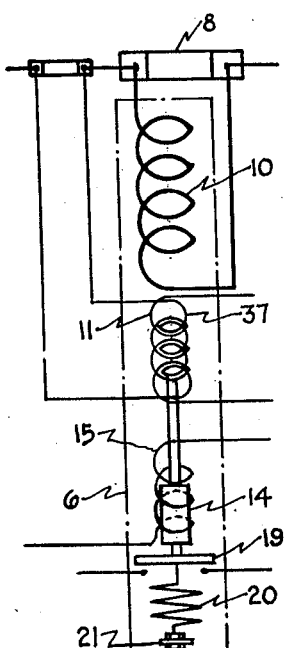
Figure 3 is a modification of Figures 1 and 2 in which torque variation is obtained by means of a cumulative coil on the relay.
Figure 4:
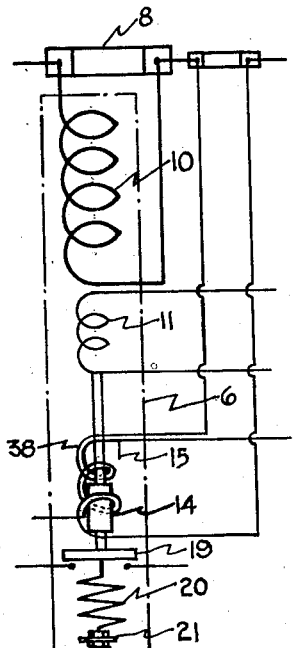
Figure 4 is a further modification of Figure 1 in which torque variation is obtained by means of a coil on the relay.
Figure 5:
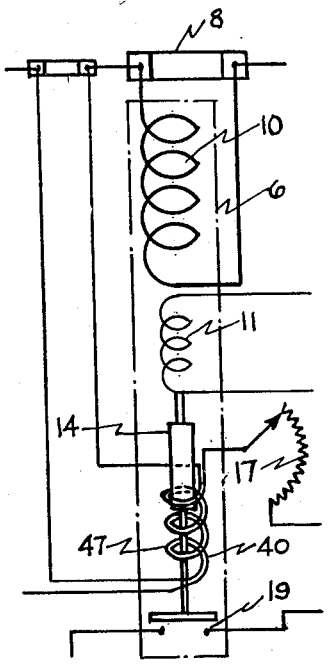
Figure 5 is a modification similar to Figure 4 but applicable to Figure 2.

The effect of the differential series field 7 in reducing the torque with an increase in load can be attained in many other ways which come within the scope of my invention. Sufficient armature reaction would act in substantially the same manner as the action of the series field 7. Further the action of a coil 37 on relay 6 carrying current proportional to that in the generator armature 9 and wound cumulative to coil 11 would provide equivalent results to the action of the series field 7 as shown in Figure 3. Similar equivalent action can be provided by a coil 38 on relay 6 carrying current proportional to that in the generator armature 9, the action of which would oppose the action of spring 20 and would thus provide for balancing the torque at lower values with increasing amounts of armature current as shown in Figure 4.

Where the service to which the vehicle is subjected is such that at times it is desirable to operate it with the prime mover delivering power at substantially its maximum output, and at other times it is desirable to have the vehicle more directly controlled, it may be desirable to install a duplicate set of contacts on governor 22 as shown. With such operation, one set of contacts (51) would be adjusted to make connection when the minimum desirable operating speed of the prime mover is reached. A second set of contacts (52) would be adjusted to make connection when the maximum operating speed to the prime mover is reached. These two sets of contacts would preferably be connected without the controlling switches. A third set of contacts (53) would be adjusted so as to make contact at or somewhat below the maximum desirable operating speed of the prime mover and the fourth set of contacts (54) would be adjusted to make contacts at some speed somewhat below the set speed for the third set of contacts (53). Both the third and fourth sets of contacts are preferably connected with controlling switches 49 and 48 respectively, and when these switches are in the closed position, the third and fourth sets of contacts act respectively as maximum and minimum speed controllers for the prime mover, and the first and second contacts will not operate as the third and fourth set of contacts will control the operation before the first and second set will come into operating contact. In this manner when switches 48 and 49 are closed the vehicle will operate at or near maximum power output of the prime mover and its speed will vary in a manner such as to utilize this power. When the switches 48 and 49 are open, the vehicle speed will be under the control of the operator and the prime mover speed will vary so as to deliver the power required by the vehicle at the controlled vehicle speed. If it is desirable that the maximum speed of prime mover under both conditions of maximum power output and of vehicle speed control be the same, then the third contact may be omitted. Where, under this method of operation and control, with the speed of the prime mover under the control of the governor, it is desirable to provide a maximum speed limit on the vehicle, I prefer that switches 48 and 50 be so interlocked, as for example by the lever 55, that when switch 48 is closed, switch 50 is in the open position.

Now referring to Figure 2, the action and the parts are substantially the same as in Figure 1. However, on relay 6, the adjustable spring 20 is shown as being replaced by coil 40 acting on armature 14. Coil 40 is energized by the battery 16 through adjustable resistances 17 and 45. Resistance 45 replaces resistance 13 of Figure 1 but is connected with the throttle 26 in such manner that when the throttle is in open position resistance 45 is out of circuit and when the throttle 26 is in closed position the maximum amount of resistance 45 is in series with the coil 40. In Figure 2, generator 41 driven at a speed proportional to the speed of prime mover 1, and voltmeter type relay 42, replace governor 22 and relay 33 of Figure 1. Further, vehicle governor 31 of Figure 1 is not shown.

The action of coil 10 on coil 11 is balanced by the action of coil 40 on armature 14 and so long as resistances 17 and 45 are not adjusted, the action of coil 40 on armature 14 will be substantially constant. When the throttle 26 is closed by movement of lever 25, the resistance 45 is simultaneously increased, the current of coil 40 is decreased, and the balancing force or torque acting in opposition to the force of coil 10 on coil 11 is decreased. By properly proportioning resistance 45, relay 6 will properly govern the counter-torque of generator 2 at all positions of the throttle 26.

The limit of speed of the prime mover in this case is effected by the action of generator 41 and relay 42. The voltage of generator 41 increases with increase in prime mover speed and decreases with decrease in prime mover speed. As shown in the diagram, arm 46 moves to the right on a decrease in voltage and to the left on an increase in voltage. Also as indicated in the diagram, the movement of the arm 46 can be adjusted by means of the tension adjustment 44 and the series resistance 43. In this way the relay 42 can be adjusted to control the operations at any predetermined maximum prime mover speed and any independently predetermined minimum prime mover speed. During operation within the pre-determined speed, relay contacts 35 are closed thus short circuiting resistance 32, and leaving resistance 12 in series with coil 11 of relay 6. When the pre-determined maximum prime mover speed is reached, arm 46 moves to the left, opens contacts 35, and removes the short circuit from around resistance 32. This changes the metering ratio and acts to decrease the motor load, to increase generator torque, and to decrease prime mover speed as has been previously explained. When the pre-determined minimum prime mover speed is reached, arm 46 moves to the right and makes contact 23, short circuits both resistance 32 and resistance 12, thus changing the metering ratio to increase the speed of the prime mover.

Also the equivalent of differential series field 7 can be obtained by the action of coil 37 on relay 6 wound cumulative to coil 11 and carrying current proportional to the current in generator armature 9 in the manner described in explaining the action under Figure 1. Or coil 47 wound differentially to coil 40 and carrying current proportional to the current in generator armature 9, would serve the same purpose.

Many changes can be made in the details without departing from the spirit of my invention.

I claim:

1. The combination of a prime mover, an electric motor, and an intermediate member functionally connecting the prime mover and electric motor together, controlling means co-acting with said intermediate member responsive to changes in load of the electric motor to vary the speed of said prime mover in accordance with the load, and means operating on said controlling means acting to limit the speed of said prime mover.

2. The combination of a prime mover, a driving member, and an intermediate member functionally connecting the prime mover and driving member together, controlling means co-acting with said intermediate member responsive to changes in load of the driving member to vary the speed of said prime mover in accordance with the load, and means operating on said controlling means acting to limit the minimum speed of said prime mover.

3. The combination of a prime mover, an electric motor, and an intermediate member functionally connecting the prime mover and electric motor together, controlling means co-acting with said intermediate member responsive to changes in load of the electric motor to vary the speed of said prime mover in accordance with the load, and means operating on said controlling means acting to limit the maximum speed of said prime mover.

4. The combination of a prime mover, a driving member, and an intermediate member functionally connecting the prime mover and driving member together, controlling means co-acting with said intermediate member responsive to changes in load of the driving member to vary the speed of said prime mover in accordance with the load, and means operating on said controlling means acting to limit the minimum and maximum speed of said prime mover.

5. The combination of a prime mover, a driving member, and an intermediate member functionally connecting the prime mover and driving member together, means substantially measuring the torque of said intermediate member operating on said intermediate member and operating to adjust said torque and to control the speed of said prime mover, and means adjusting the value at which said torque is measured and responsive to the speed of said prime mover acting to limit the speed of said prime mover.

6. The combination of a prime mover, a driving member, and an intermediate member functionally connecting the prime mover and driving member together, means substantially measuring the torque of said intermediate member operating on said intermediate member and operating to adjust said torque and to control the speed of said prime mover, and means adjusting the value at which said torque is measured and responsive to the speed of said prime mover acting to limit the minimum speed of said prime mover.

7. The combination of a prime mover, a driving member, and an intermediate member functionally connecting the prime mover and driving member together, means substantially measuring the torque of said intermediate member operating on said intermediate member and operating to adjust said torque and to control the speed of said prime mover, and means adjusting the value at which said torque is measured and responsive to the speed of said prime mover acting to limit the maximum speed of said prime mover.

8. The combination of a prime mover, a driving member, and an intermediate member functionally connecting the prime mover and driving member together, means substantially measuring the torque of said intermediate member operating on said intermediate member and operating to adjust said torque and to control the speed of said prime mover, and means adjusting the value at which said torque is measured and responsive to the speed of said prime mover acting to limit the maximum and minimum speed of said prime mover.

9. In a drive system, the combination of a prime mover, a driving member subject to varying load conditions, intermediate means connecting the prime mover and driving member together, controlling means responsive to changes in load of the driving member and operating on the intermediate member whereby the intermediate member is responsive to the varying load conditions of the driving member and the speed of the prime mover is thereby so adjusted that the changed load becomes substantially the full load of the prime mover at that speed, and means responsive to changes in speed of the prime mover and operating on with the controlling means whereby the load of the driving member is adjusted and the speed of the prime mover is limited.

10. The combination of a prime mover, a driving member and an intermediate member functionally connecting the prime mover and the driving member together, controlling means operating on the intermediate member and responsive to changes in load on the driving member whereby under changes in load on the driving member, the speed of the prime mover is so adjusted that it increases with increased load on the driving member, and means responsive to changes in speed of the prime mover operating on the controlling means to limit the speed of the prime mover.

11. The combination of a prime mover, controlling means therefor, a driving member subjected to a variable load and an intermediate member functionally connecting the prime mover and the driving member together, means distinct from and responsive to changes in load of the intermediate member and operating on the intermediate member, whereby under changes in load the speed of the prime mover is adjusted to that amount at which the load of the prime mover at any given setting of the controlling means corresponds to the load of the driving member, and means responsive to changes in speed of the prime mover acting on said load responsive means to adjust the load of the driving member and limit the speed of the prime mover.

12. In combination as means for propelling automotive equipment, an internal combustion engine, a driving member and an intermediate member functionally connecting the prime mover and the driving member together, means distinct from and responsive to changes in load on the intermediate member operating on the intermediate member, whereby under changes in load of the driving member the speed of the internal combustion engine is increased with increased load on the driving member, and means responsive to the speed of the prime mover operating on said load responsive means to limit the speed of the prime mover.

13. In combination, a prime mover, a generator driven thereby, means forming an electrical load for receiving energy from said generator, means for supplying excitation current to said generator, means for controlling the flow of said excitation current whereby as said electrical load increases the torque of said generator decreases, and means responsive to the speed of said prime mover co-operating to limit said speed.

14. In apparatus of the character described, in combination, a prime mover, a generator adapted to be driven thereby, a motor adapted to be supplied with energy from said generator, means forming a variable load and adapted to be driven by said motor, a field on said generator, a relay for controlling said field whereby on changes in said variable load the torque of the generator will decrease with increase in load and increase with decrease in load, and means responsive to the speed of the prime mover and co-operating with said relay whereby the speed of the prime mover is limited.

15. The combination of a prime mover, a series motor subjected to a variable load, and an electric generator functionally connecting the prime mover and the motor together, means connecting the prime mover and electric generator together, and means operating on the electric generator responsive to changes in load of the motor whereby changes in load on the motor are transmitted to the prime mover and whereby the speed of the prime mover will so vary when the load is varied that the prime mover will so respond as to assume substantially all of the varied load over a considerable range of engine speed, and means responsive to the speed of said prime mover whereby said range of engine speed is limited to predetermined values.

16. In an automotive vehicle, a series motor adapted to drive said vehicle, a generator adapted to supply electric energy to said motor, a prime mover adapted to drive said generator, a field winding on said generator, means for controlling said generator field winding responsive to changes in load on said motor and means responsive to changes in speed of prime mover adapted to adjust the standard of control on said means for controlling the generator field winding.

HENRY ROSENTHAL.